(12) United States Patent
Sweeney et al.

(10) Patent No.: US 7,159,816 B2
(45) Date of Patent: Jan. 9, 2007

(54) MAGNETIC CORE WINDING METHOD

(75) Inventors: Matthew Sweeney, Ringwood, IL (US); John Medema, Schaumburg, IL (US); Michael Roeber, Woodstock, IL (US)

(73) Assignee: Actown Electricoil, Inc., Spring Grove, IL (US)

( * ) Notice: Subject to any disclaimer, the term of this patent is extended or adjusted under 35 U.S.C. 154(b) by 58 days.

(21) Appl. No.: 11/136,196

(22) Filed: May 24, 2005

(65) Prior Publication Data

US 2005/0247815 A1 Nov. 10, 2005

Related U.S. Application Data

(62) Division of application No. 10/882,866, filed on Jul. 2, 2004.

(60) Provisional application No. 60/511,564, filed on Oct. 15, 2003.

(51) Int. Cl.
*B65H 81/02* (2006.01)

(52) U.S. Cl. .................... 242/434; 242/434.9

(58) Field of Classification Search ............. 242/432.5, 242/434, 434.5–434.9
See application file for complete search history.

(56) References Cited

U.S. PATENT DOCUMENTS

| | | | | |
|---|---|---|---|---|
| 2,973,154 A | * | 2/1961 | Blackburn | ............... 242/434.6 |
| 3,634,708 A | | 1/1972 | Fisher | |
| 3,635,260 A | | 1/1972 | Olson | |
| 3,668,589 A | | 6/1972 | Wilkinson | |
| 3,699,764 A | | 10/1972 | Van Haaften | |
| 3,732,901 A | | 5/1973 | Kent et al. | |
| 3,766,641 A | * | 10/1973 | Metzler et al. | ............... 29/605 |
| 3,821,574 A | | 6/1974 | Ruelle et al. | |
| 3,868,766 A | | 3/1975 | Gramlich et al. | |
| 3,979,084 A | | 9/1976 | Ruhl et al. | |
| 4,117,582 A | | 10/1978 | Borelly | |
| 4,199,862 A | | 4/1980 | Gorton, Jr. | |
| 4,288,041 A | | 9/1981 | Marzec et al. | |
| 4,331,990 A | | 5/1982 | Frandsen | |
| 4,379,527 A | | 4/1983 | Albo et al. | |
| 4,548,365 A | | 10/1985 | Marzec et al. | |
| 4,601,433 A | | 7/1986 | Hayashi et al. | |
| 4,613,780 A | | 9/1986 | Fritzsche | |
| 4,683,919 A | | 8/1987 | Macemon et al. | |
| 4,704,553 A | | 11/1987 | Resnicow | |

(Continued)

FOREIGN PATENT DOCUMENTS

DE 19505812 A1 2/1997

(Continued)

OTHER PUBLICATIONS

Kawamura, et al., Study on High Precision Winding of Toroidal Coil and Automation of its Process, IEEE/ASME International Conference on Advanced Intelligent Mechatronics Proceedings, Jul. 8-12, 2001, Como, Italy.

(Continued)

*Primary Examiner*—Emmanuel M Marcelo
(74) *Attorney, Agent, or Firm*—Adam K Sacharoff; Much Shelist

(57) ABSTRACT

The invention relates to winding wire around a magnetic core. The invention includes forming corners on the wire that align with inside corners of the magnetic core such that the wire is more tightly wound around the magnetic core. The invention also includes pinching a portion of wire that is positioned on the internal diameter of a magnetic core when the wire is wound around the core to provide more turns of the wire around the magnetic core. A magnetic inductor made in accordance with the present invention can have increased inductance, lower temperature rise, smaller size, and exhibit less EMI noise than the prior art.

19 Claims, 14 Drawing Sheets

U.S. PATENT DOCUMENTS

| | | | |
|---|---|---|---|
| 4,779,812 A | 10/1988 | Fisher et al. | |
| 4,814,735 A | 3/1989 | Williamson | |
| 4,859,890 A | 8/1989 | Sedgewick | |
| 4,872,618 A | 10/1989 | Sato et al. | |
| 4,880,173 A | 11/1989 | Lachey | |
| 4,896,839 A | 1/1990 | Curtis, Jr. et al. | |
| 4,917,317 A | 4/1990 | Lihama et al. | |
| 4,956,626 A | 9/1990 | Hoppe et al. | |
| 4,988,055 A | 1/1991 | Sakai et al. | |
| 5,015,904 A | 5/1991 | Kleemann | |
| RE33,628 E | 7/1991 | Hahn | |
| 5,070,317 A | 12/1991 | Bhagat | |
| 5,100,074 A | 3/1992 | Jones | |
| 5,107,366 A | 4/1992 | Huang et al. | |
| 5,165,162 A | 11/1992 | Charles | |
| 5,174,013 A | 12/1992 | Hiroshima et al. | |
| 5,331,729 A | 7/1994 | Moorehead | |
| 5,378,966 A | 1/1995 | Marszalik | |
| 5,515,022 A | 5/1996 | Tashiro et al. | |
| 5,547,532 A | 8/1996 | Wenersbach, Jr. et al. | |
| 5,563,460 A | 10/1996 | Ammar | |
| 5,714,822 A | 2/1998 | Kawano et al. | |
| 5,732,900 A * | 3/1998 | Burch | 242/432.5 |
| 5,748,013 A | 5/1998 | Beauclair et al. | |
| 5,763,978 A | 6/1998 | Uchida et al. | |
| 5,828,282 A | 10/1998 | Tiemann | |
| 5,860,615 A * | 1/1999 | Burch | 242/432.5 |
| 5,875,988 A | 3/1999 | Hashimoto | |
| 5,886,444 A | 3/1999 | Enomoto et al. | |
| 5,925,944 A | 7/1999 | Emery et al. | |
| 5,986,377 A | 11/1999 | Yamada et al. | |
| 6,002,320 A | 12/1999 | Uda et al. | |
| 6,007,015 A | 12/1999 | Kinutani et al. | |
| 6,008,563 A | 12/1999 | Baba et al. | |
| 6,011,339 A | 1/2000 | Kawakami | |
| 6,111,329 A | 8/2000 | Graham et al. | |
| 6,133,667 A | 10/2000 | Sawada et al. | |
| 6,138,343 A | 10/2000 | Hill et al. | |
| 6,144,136 A | 11/2000 | Umeda et al. | |
| 6,144,279 A | 11/2000 | Collins et al. | |
| 6,160,335 A | 12/2000 | Ishida et al. | |
| 6,188,306 B1 | 2/2001 | Wollesen | |
| 6,195,083 B1 | 2/2001 | Salcudean et al. | |
| 6,198,190 B1 | 3/2001 | Umeda et al. | |
| 6,216,513 B1 | 4/2001 | Nakamura et al. | |
| 6,218,758 B1 | 4/2001 | Miura et al. | |
| 6,268,678 B1 | 7/2001 | Asao et al. | |
| 6,313,559 B1 | 11/2001 | Kusase et al. | |
| 6,373,153 B1 | 4/2002 | Hazelton et al. | |
| 6,392,525 B1 | 5/2002 | Kato et al. | |
| 6,407,655 B1 | 6/2002 | Kitamura | |
| 6,476,530 B1 | 11/2002 | Nakamura et al. | |
| 6,509,665 B1 | 1/2003 | Nishiyama et al. | |
| 6,512,437 B1 | 1/2003 | Jin et al. | |
| 6,512,438 B1 | 1/2003 | Yoshimori et al. | |
| 6,531,864 B1 | 3/2003 | Montagu | |
| 6,553,650 B1 | 4/2003 | Nakamura et al. | |
| 6,555,942 B1 | 4/2003 | Hsu | |
| 6,557,793 B1 * | 5/2003 | Nakazawa et al. | 242/434.5 |
| 6,590,310 B1 | 7/2003 | Takano | |
| 6,600,399 B1 | 7/2003 | Trandafir | |
| 6,674,203 B1 | 1/2004 | Kurahashi et al. | |
| 6,687,974 B1 | 2/2004 | Asao et al. | |
| 6,695,244 B1 * | 2/2004 | Burch | 242/432.5 |
| 6,741,004 B1 | 5/2004 | Senoo et al. | |
| 6,753,633 B1 | 6/2004 | Eberle | |
| 6,770,996 B1 | 8/2004 | Yoshida et al. | |
| 6,770,999 B1 | 8/2004 | Sakurai | |
| 6,862,797 B1 | 3/2005 | Neet | |
| 6,870,292 B1 | 3/2005 | Owada et al. | |
| 6,870,294 B1 | 3/2005 | Hozheu et al. | |

| | | |
|---|---|---|
| 2002/0017971 A1 | 2/2002 | Koyama et al. |
| 2002/0069508 A1 | 6/2002 | Graham et al. |
| 2002/0112344 A1 | 8/2002 | Harada et al. |
| 2002/0180572 A1 | 12/2002 | Kakehashi et al. |
| 2003/0173860 A1 | 9/2003 | Even |
| 2004/0027022 A1 | 2/2004 | Weir |
| 2004/0195926 A1 | 10/2004 | Hiwaki et al. |
| 2004/0237287 A1 | 12/2004 | Bramson et al. |
| 2005/0012427 A1 | 1/2005 | Seki et al. |

FOREIGN PATENT DOCUMENTS

| | | |
|---|---|---|
| DE | 19505812 C2 | 2/1997 |
| EP | 0097205 A1 | 1/1984 |
| EP | 0135483 A1 | 3/1985 |
| EP | 0461109 | 9/1990 |
| EP | 0676776 | 2/1995 |
| EP | 0804797 | 1/1996 |
| EP | 0884824 | 6/1998 |
| EP | 0992101 | 8/1999 |
| EP | 1100177 | 5/2001 |
| EP | 1383225 A1 | 1/2004 |
| GB | 421353 | 12/1934 |
| GB | 536611 | 9/1940 |
| GB | 656891 | 9/1951 |
| GB | 778191 | 7/1957 |
| JP | 54044710 | 4/1979 |
| JP | 58043171 | 3/1983 |
| JP | 06098512 | 4/1984 |
| JP | 59113732 | 6/1984 |
| JP | 60160353 | 8/1985 |
| JP | 60160355 | 8/1985 |
| JP | 60245462 | 12/1985 |
| JP | 61069346 | 4/1986 |
| JP | 61214748 | 9/1986 |
| JP | 63028239 | 2/1988 |
| JP | 63148851 | 6/1988 |
| JP | 64001445 | 1/1989 |
| JP | 01110043 | 4/1989 |
| JP | 01154508 | 6/1989 |
| JP | 2235313 | 9/1990 |
| JP | 3070110 | 3/1991 |
| JP | 03106756 | 5/1991 |
| JP | 4115508 | 4/1992 |
| JP | 04344141 | 11/1992 |
| JP | 06007951 | 1/1994 |
| JP | 07067307 | 3/1995 |
| JP | 8069934 | 3/1996 |
| JP | 9050751 | 2/1997 |
| JP | 09154265 | 6/1997 |
| JP | 11146610 | 5/1999 |
| JP | 11178291 | 7/1999 |
| JP | 2000197294 | 7/2000 |
| JP | 2000316259 | 11/2000 |
| JP | 2001093747 | 4/2001 |
| JP | 2001148210 | 5/2001 |
| JP | 2001167930 | 6/2001 |
| JP | 2001210524 | 8/2001 |
| JP | 2001292548 | 10/2001 |
| JP | 2002050513 | 2/2002 |
| JP | 2002066629 | 3/2002 |
| JP | 2002112484 | 4/2002 |
| JP | 2002191148 | 7/2002 |
| JP | 2002291186 | 10/2002 |
| JP | 2003047213 | 2/2003 |
| JP | 2003164088 | 6/2003 |
| JP | 2004056915 | 2/2004 |
| JP | 2004096907 | 3/2004 |
| JP | 2004135466 | 4/2004 |
| JP | 2004274918 | 9/2004 |
| JP | 2004274965 | 9/2004 |
| JP | 2004289939 | 10/2004 |
| WO | WO 90/10336 | 9/1990 |

| | | |
|---|---|---|
| WO | WO 92/02982 | 2/1992 |
| WO | WO 99/39423 | 7/1999 |
| WO | WO0205980 | 1/2002 |
| WO | WO0205980 | 1/2004 |

OTHER PUBLICATIONS

Sullivan, et al., Analysis of Minimum Cost in Shape-Optimized Litz-Wire Inductor Windings, IEEE 2001, p. 1473-1478.

Kirtley, Air-Core Armature Shape: A Comparison of Helical and Straight-with-End-Turns Windings, Electric Machines and Power Systems 23:263-278, 1995, Taylor & Francis.

Shimada et al, Variations of Force-Balanced Coils for SMES, IEEE Transactions on Applied Superconductivity, vol. 12, No. 1, Mar. 2002.

* cited by examiner

MAGNETIC CORE WINDING METHOD

CROSS REFERENCE TO RELATED APPLICATIONS

The present application is a divisional application of U.S. patent Ser. No. 10/882,866, filed on Jul. 2, 2004, which claims the benefit of Provisional Application Ser. No. 60/511,564, filed on Oct. 15, 2003.

FIELD OF THE INVENTION

The present invention relates to winding wire on a magnetic core and to apparatuses used to wind the wire around the magnetic core, and related to transformers and inductors produced from the same.

BACKGROUND OF THE INVENTION

Prior United States patents of magnetic core winders, which include but are not limited to toroidal winders, include U.S. Pat. Nos. 5,331,729; 4,379,527; 4,872,618; 6,557,793; 4,288,041; and 5,875,988. In general, the prior art, as shown in FIGS. 1 through 3, illustrate the principle of winding magnet wire on a magnetic core (hereinafter "core" to create an inductor. The prior art uses a supply ring 10 and winding ring 20 with pullout or open/close type ring openings 12 and 22 to enable a core 30 to be arranged with the rings 10 and 20 passing through the center hole of the core 30. In the prior art the openings 12 and 22 are opened manually and the core 30 is passed through the openings so that each ring passes through the center hole 32 of the core, with the central axis 34 of the magnetic core 30 at right-angles to the central axis 25 of the rings.

The supply ring 10 has a U-shaped groove 14 around its circumference. In order to enable wire 40 to be wound into the groove 14, the end of the wire 40 is manually attached to the supply ring 10. The winding ring 20 has substantially the same diameter as the supply ring 10, with which it is aligned concentrically. The winding ring 20 has a wire guide 24 via which wire 40 is drawn from the supply ring 10 and a guide roller 26 to guide the wire 40.

In an actual winding operation, the core 30 is first manually inserted onto the rings 10 and 20 via the openings 12 and 22 and positioned as shown in FIG. 2. The end of the wire 40 is then attached to the supply ring 10 and the supply ring 10 is rotated around its central axis to wind the required amount of wire 40 into the groove 14. After cutting the trailing end of the wire 40, the cut end is passed through the wire guide 24 and around the guide roller 26, and is drawn radially outwards from between the rings and affixed to a retainer means or the like (not shown) provided on the periphery of the core 30.

As shown by FIG. 3, when the core 30 is being wound, a drive (not shown) is used to rotate the supply ring 10 and winding ring 20 in the opposite direction from that used to load the wire 40 onto the supply ring 10, and the wire 40 is drawn from the supply ring 10 through the wire guide 24 and guide roller 26 on the winding ring 20 and attached to the core 30. In this state, the wire wound around the supply ring 10 is spirally wound a required number of turns around the core 30, and the wire left over on the supply ring 10 is manually removed. Finally, the core wound with the wire, that is, the inductor, is removed.

The ideal single layer inductor would have a low temperature rise, high inductance, and small size. Moreover, it has been found that by increasing the wire size, total number of turns, and decreasing the core size, these more desirable properties can be achieved. Moreover, since rectangular wire has a smaller width then round wire (for a given gauge), rectangular wire may be used to increase the number of turns on a core and thus increase the inductance. As such, US Patents directed to manufacturing or forming rectangular wire from round wire are found in the art, for example, U.S. Pat. No. 6,553,650.

The winding of rectangular wire on the edge however is extremely difficult. Referring now to FIG. 4, when the wire 40 forms around the corners 34 of the core 30, the wire has a tendency to twist and lie diagonally. If the wire 40 is guided tightly on either side of the corner, the twisting can be prevented but in winding a core there is insufficient space to guide the wire as it wraps around the internal wall 36 of the core 30. In some instances, the rectangular wire is formed and the core has a piece cut therefrom which permits the wire to be slipped onto the core. However, when a piece is removed the magnetic properties may decrease and the inductance of the core may be reduced.

It is thus an object of the present invention to overcome the problems associated with the prior art while maintaining an inductor with a low temperature rise, high inductance, and a small size.

SUMMARY OF THE INVENTION

In view of the above drawbacks of the prior art, an object of the present invention is to provide an inductor with lower temperature rise, higher inductance, smaller size, or less EMI noise when compared to an inductor made in accordance with the prior art.

To achieve the above object, the present invention provides a core to be wound with a wire. A portion of the wire is first wrapped around an outer edge of a form tool positioned in front of the core. The outer edge of the form tool is shaped similarly to the inside diameter of the core. Once the portion of the wire is formed around the form tool, the portion of the wire will be preformed with a shape that matches the inside shape of the core. Thus, providing a tight fit around such the inside diameter of the core. The form tool can be retracted such that the wire can be pulled through the core wherein the preformed portion of the wire aligns with the inside shape of the core. This process can be repeated until the core is wound to form an inductor. This process is also preferred when the wire is rectangular. In an embodiment where the wire is round, the wire once formed around the form tool is flattened or pinched. The pinched portion of the wire once wound around the core will allow a more efficient winding around the core and thereby provide an inductor with a lower temperature rise, higher inductance, or smaller size. The process can be achieved with either an automatic winding apparatus or using a manually hook winding method.

After a first layer of wire is wound around the magnetic core, multiple layers can be wound using the same process to form transformers. When switching to a second layer, the form tool should be replaced with a second form tool that has an outside shape that matches the inside shape of the first layer of wire, such that the second layer of wire winds closely around the first layer.

The process of providing an inductor with a formed wire as described above may be manufactured with rectangular wire or round wire and by manual hook winding process or on an automatic winder.

BRIEF DESCRIPTION OF THE DRAWINGS

A fuller understanding of the foregoing may be had by reference to the accompanying drawings, wherein:

FIG. 11b is a cross sectional view of the inductor of FIG. 11a;

DETAILED DESCRIPTION OF THE EMBODIMENTS

Figure 1:
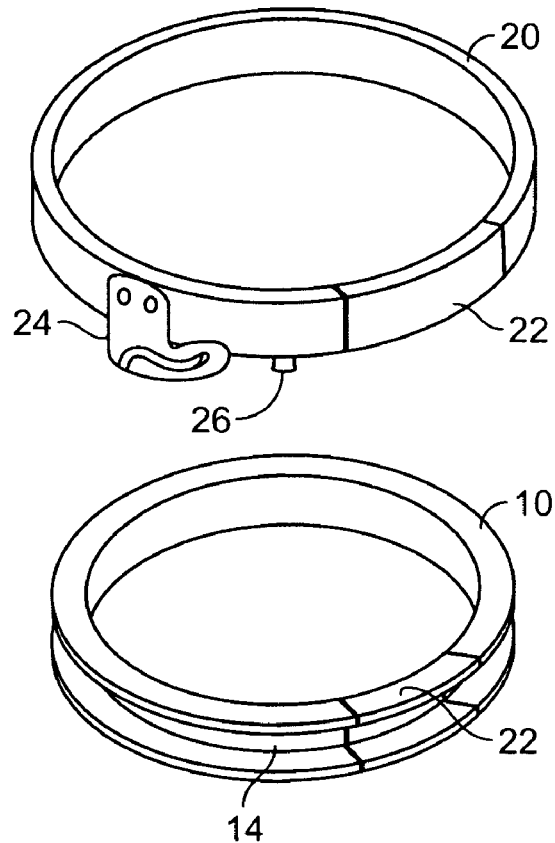
FIG. 1 is a disassembled perspective view of a prior art shuttle.
Figure 2:
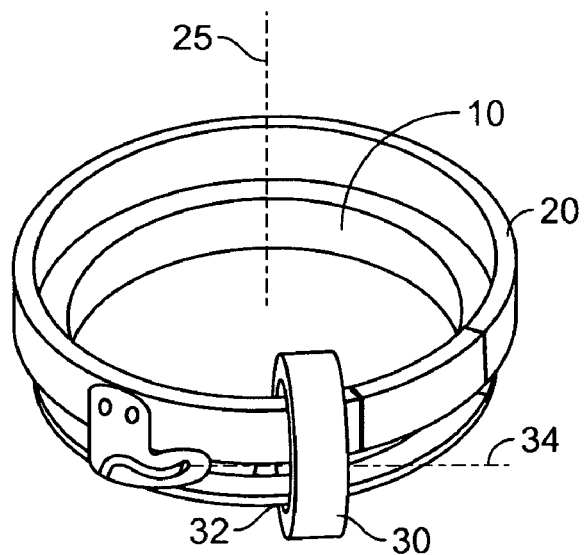
FIG. 2 is a perspective view of a prior art shuttle.
Figure 3:
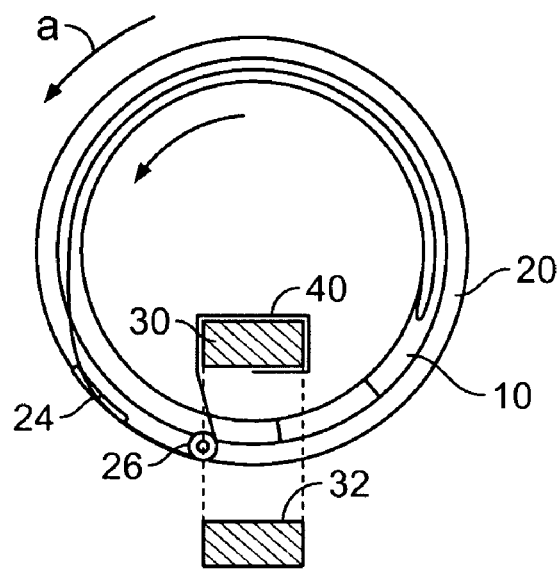
FIG. 3 shows the direction of rotation of the shuttle and the run of the wire during winding using a prior art winder.
Figure 4:
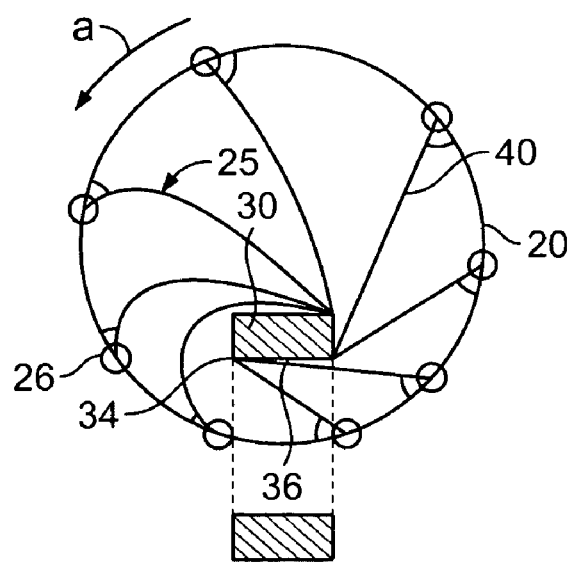
FIG. 4 illustrates the supplying of the wire during each rotation of the shuttle of a prior art winder.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

Figure 5:
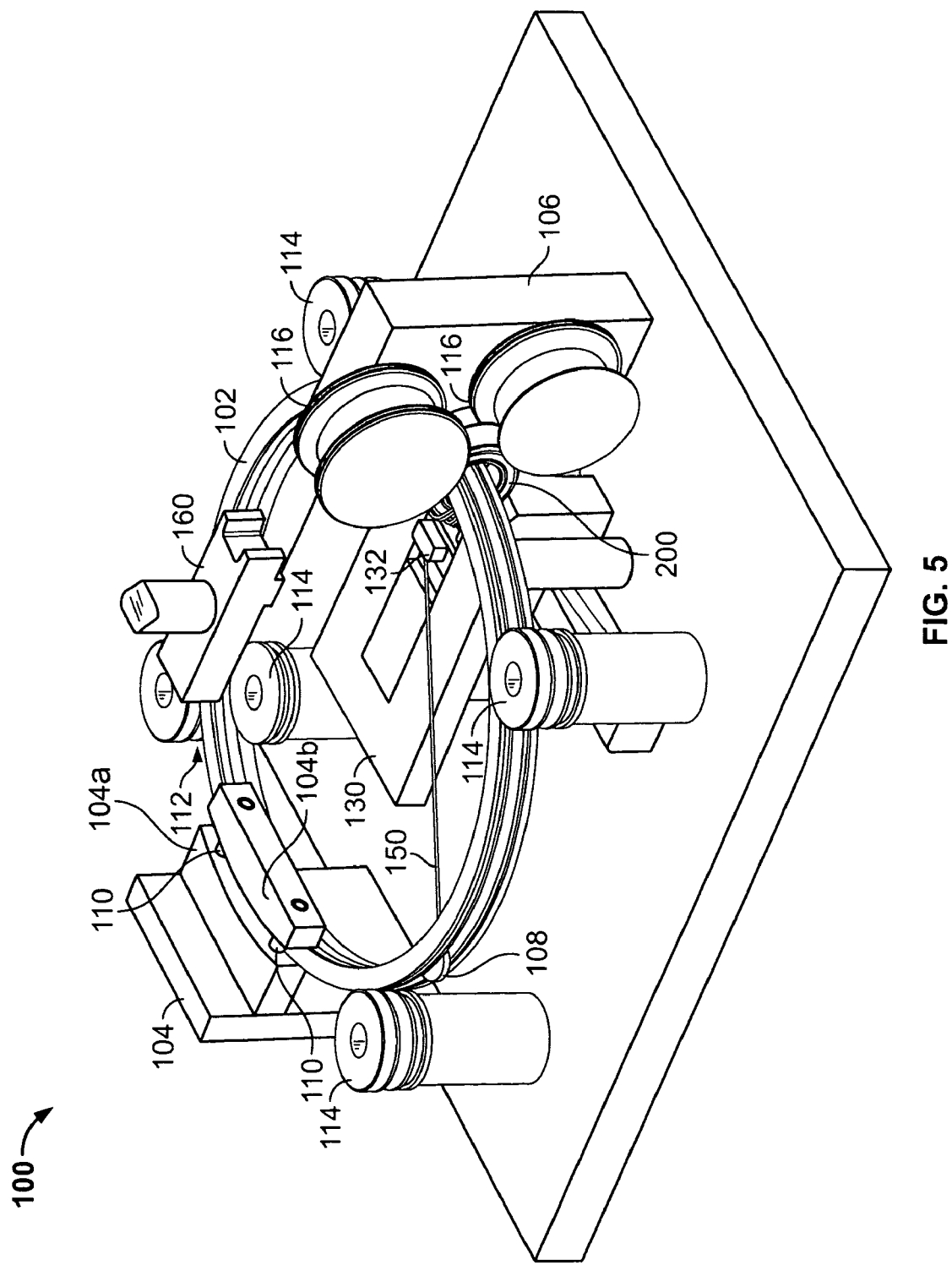
FIG. 5 shows the main parts of a core automatic winding apparatus in accordance with the present invention.

Referring now to FIG. 5 there is illustrated a magnetic core automatic winding apparatus 100 (winder) according to the present invention. In this embodiment, the winder 100 includes a supply ring and a winding ring, referred to herein as a shuttle 102. A shuttle rotation mechanism (not shown) drives the shuttle 102, while a core rotation mechanism and support 106 rotates a magnetic core 200. The apparatus 100 further includes a control unit 105 for controlling the rotation mechanisms 112 and 106.

The magnetic core 200 (referred to herein as "core") is generally, but not limited to electrical oval or other noncircular core shapes and may be as shown toroidal in shape. Moreover, the magnetic core 200 may or may not have a solid ring, such that the ring may include liquid or hybrid liquid/solid interior.

The shuttle 102 includes a U-shaped winding groove (not shown) for holding a wire 150 and a shuttle guide roller 108 that guides the wire 150 out of the shuttle 102. The shuttle rotation mechanism is used to independently rotate the shuttle such that the wire 150 can be pulled out of the shuttle 102. The shuttle rotation mechanism includes a drive roller 112 that engages and drives the shuttle 102. In addition, a plurality of drive support rollers 114 may be included to help guide or rotate the shuttle during the winding of the core 200.

The apparatus 100 may also include a brake mechanism 104, also controlled by the control unit 105, for placing tension on the wire 150. The brake mechanism 104 includes a first brake piece 104a and a second brake piece 104b secured about the shuttle 102. The second brake piece 104b is suspended from the first brake piece 104a by pins 110. When the brake mechanism is activated by the control unit 105, tension is applied to the wire 150, such that the wire 150 is maintained in a taut position.

The core rotation mechanism 106 includes two drive rollers 116 located at a specified point along the shuttle 102, with one drive roller above the shuttle 102 and the other below. The two drive rollers 116 engage the core 200 such that when operating the core 200 may rotate about its axis.

Figure 6:
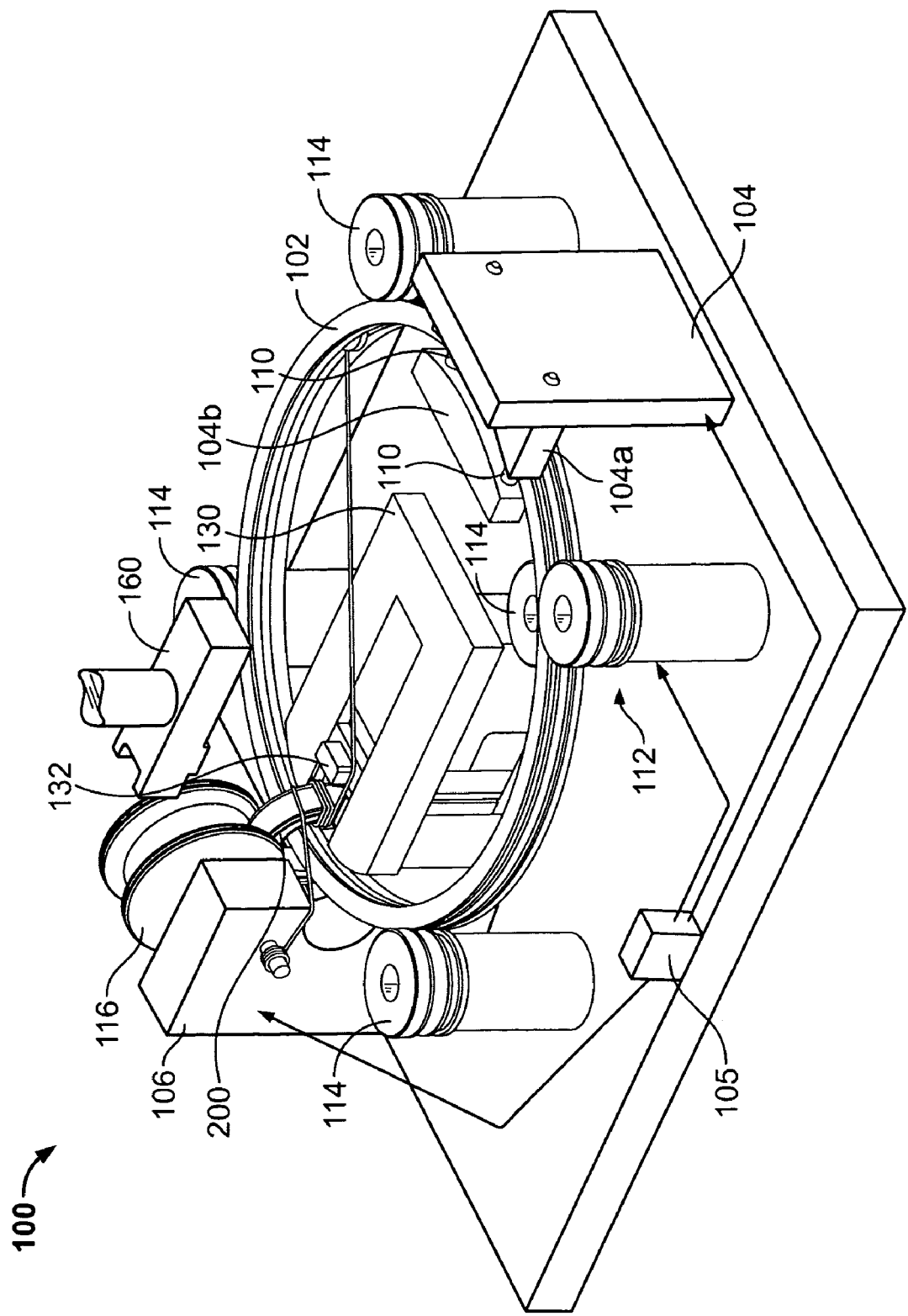
FIG. 6 is the core automatic winding apparatus of FIG. 5 rotated 180°.
Figure 7:
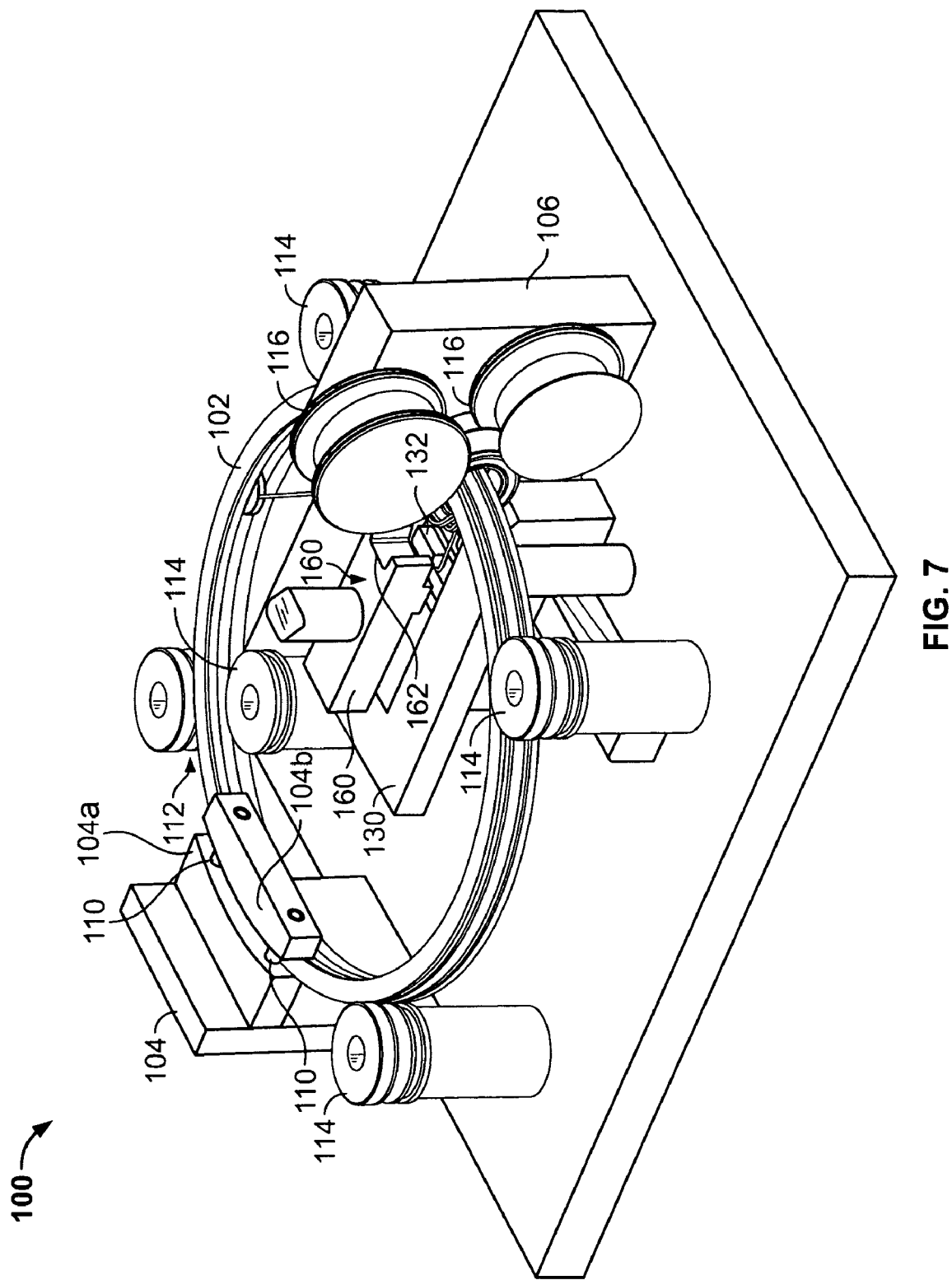
FIG. 7 shows the core automatic winding apparatus of FIG. 5 with the flattening tool pinching the wire.
Figure 8:
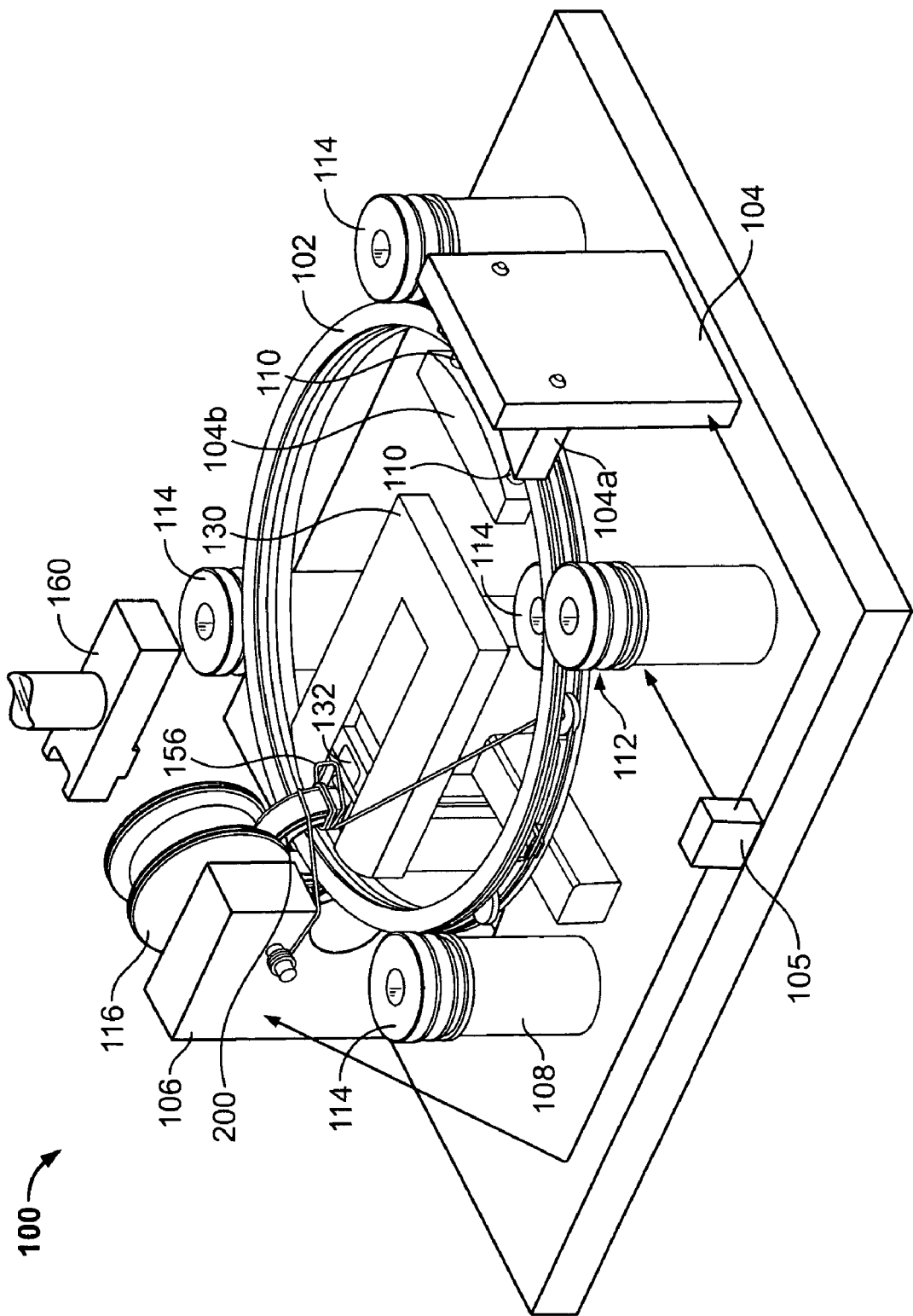
FIG. 8 is the core automatic winding apparatus of FIG. 6 with the forming tool retracted.

Referring also to FIGS. 6 through 8, the automatic winder 100 further includes a form table 130 positioned and aligned with the core 200. The form table 130 includes a form tool 132 that is horizontally moveable in relation to the form table 130. The form tool 132 may thus be moved a specified distance D (FIG. 9a) from the outside wall 206 of the core 200. The specified distance is defined as being substantially equal to the length of the outside wall 206 of the core 200. The form tool 132 is also retractable within the form table 130, which as explained in greater detail below, is done when the wire 150 is wrapped around the core 200.

Figure 9B:
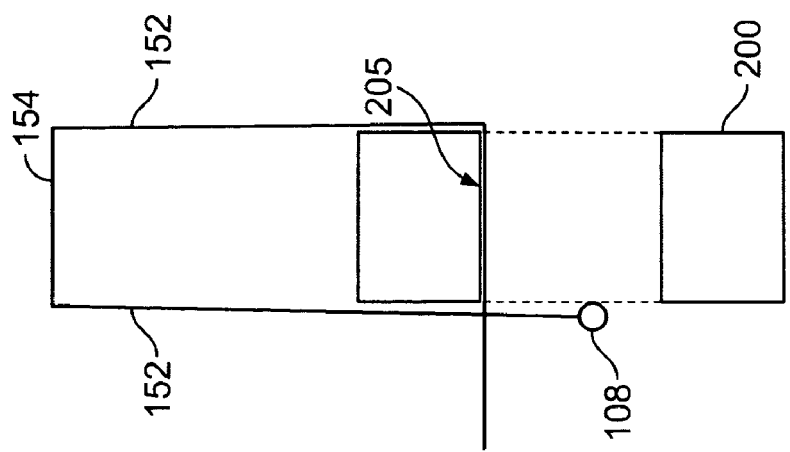
FIG. 9b is a cross sectional view of the core of FIG. 9a with the forming tool retracted.
Figure 9A:
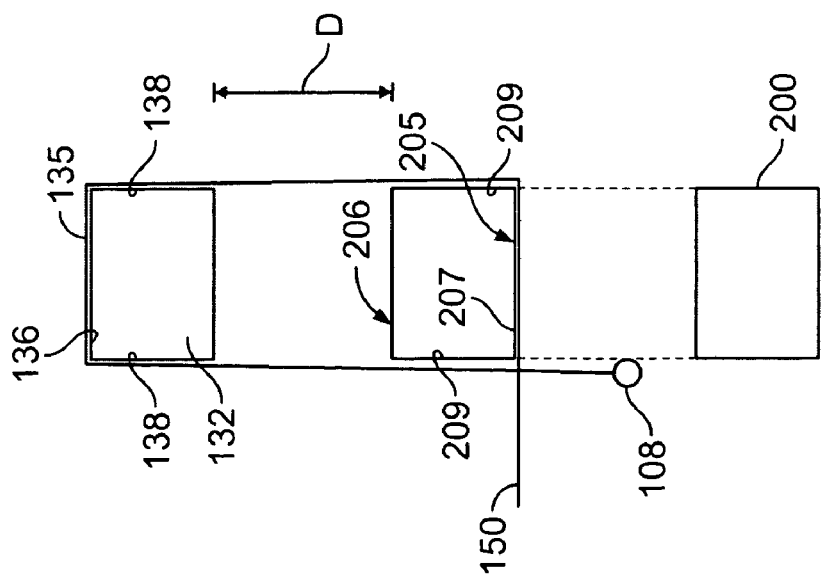
FIG. 9a is a cross sectional view of the core and forming tool illustrating the wire wrapped around the forming tool.

Referring also to FIG. 9a, the form tool 132 includes an outside profile 135 that is substantially the same as an inside profile 205 defined by the core 200. As used throughout this invention the outside profile 135 of the form tool 132 may be defined as just the outside wall 136 or may be defined to include the sidewalls 138. Furthermore the inside profile 205 defined by the core 200 may include just the inside wall 207 or may be defined to include the sidewalls 209 such that any corners formed between the inside wall 207 and the sidewalls 209 are defined by the definition of the inside profile of the core 200. Thus, the inside profile of the core 200 may include straight, rounded, or slightly arced corners. Irregardless of the exact shape, it is an important aspect of the invention that the form tool have a matching profile such that the wire 150 is wound tight against the inside profile 205 of the core 200. Moreover, as used in this invention, the core may include an outside profile 206 that may include any portion not covered by the inside profile 205.

If the wire 150 is rectangular, the wire 150 is wrapped around the form tool 132 and then the form tool 132 is retracted (shown in FIG. 9b as being removed for clarity, and as seen in FIG. 8 the form tool 132 is recessed down into the form table 130). The wire 150 thus includes a preformed portion 154 (identified between numerals 152) that substantially aligns with the inside profile 205 defined by the core 200. As such, the core 200 will be wrapped with a more tightly fitted wire providing for an ideal inductor.

Continuing to refer to FIG. 7, if the wire 150 is round, the automatic winder 100 is also equipped with a flattening tool 160. The flattening tool used, may be, pneumatic presses, hydraulic presses, toggle presses, flywheel type presses, or hammers. The flattening tool 160 includes a notched section 162 that accommodates for the form tool 132. When the flattening tool 160 is pressed down onto the wire 150 (FIG. 7) the preformed portion 154 of the wire 150 is pinched or substantially flattened. Once flattened the flattening tool 160 is lifted away from the forming table 130 and the forming tool 132 is retracted (FIG. 8) to permit the preformed and flattened wire 150 to be pulled and wrapped around the core 200.

Figure 10:
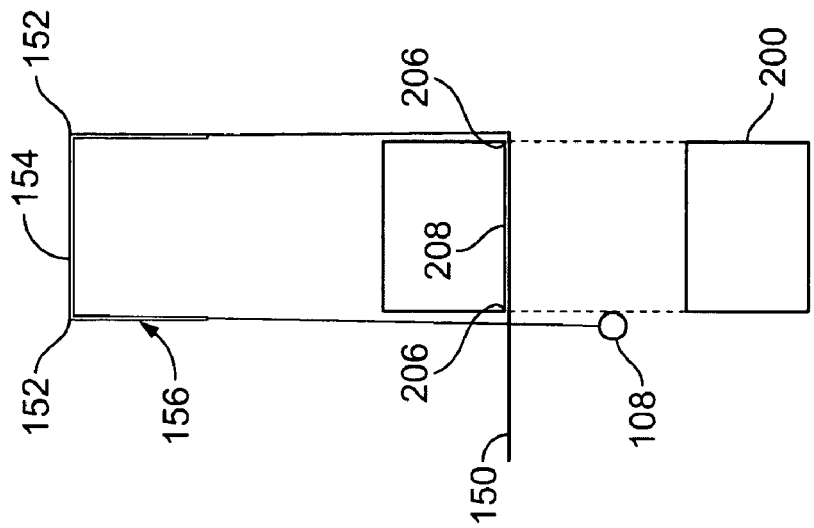
FIG. 10 is a cross sectional view of the core with the wire pinched and with the forming tool retracted.

Illustrated in FIG. 10, the preformed portion 154 of the wire 150 is flattened and is shown as having a larger thickness than the non-flattened portion, illustrated generally as flattened preformed wire 156. It is appreciated by those skilled in the art that the portion of the flattened wire 150 may be less or more than what is illustrated without departing from the teachings herein. Moreover, the substantial change in thickness of the wire 150 is done only to illustrate that a change in thickness has taken place. The change in thickness may be less dramatic such as that formed by a tapering region between the flattened and non-flattened portions of the wire 150.

Figure 11A:
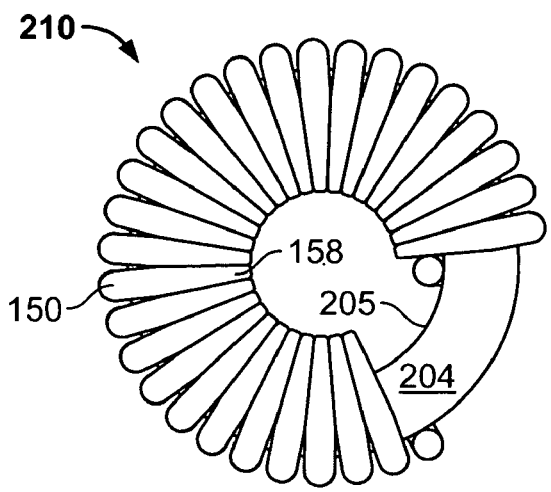
FIG. 11a is a side view of an inductor.
Figure 11B:
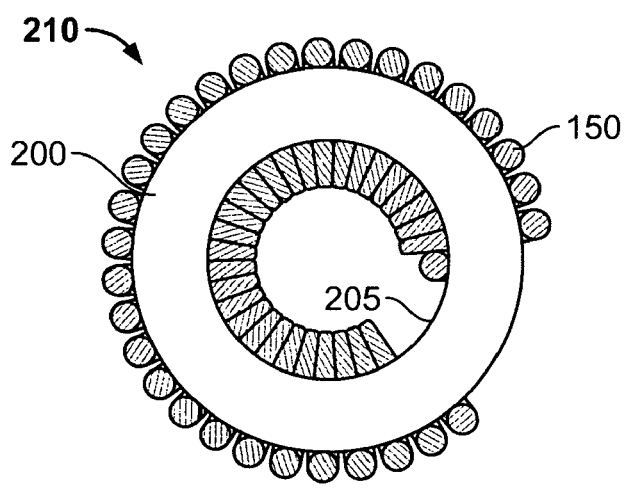

The core 200 is then rotated and the process is repeated until the desired turns are made spirally wrapping to form a inductor 210, illustrated in FIGS. 11*a* and 11*b*. By flattening or pinching the portion of wire, the width is reduced which allows more turns per layer of the wire around the core. This creates an inductor 210 that can have a lower temperature rise, higher inductance, and be smaller in size as compared to an inductor made in accordance to the prior art. As illustrated, the wire 150 is pinched preferably at an angle such that there is a tapering region 158 from the unpinched wire to the pinched wire.

Figure 11C:
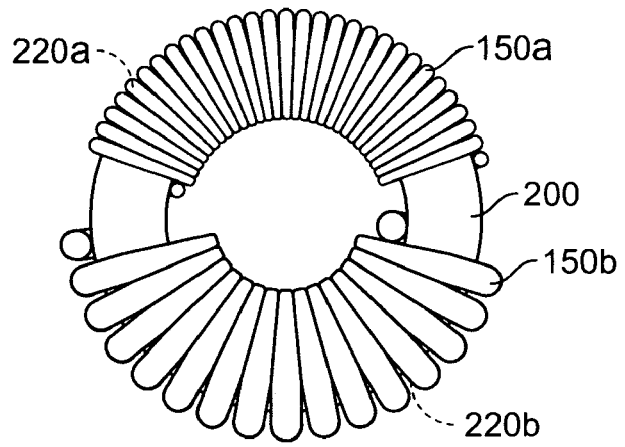
FIG. 11c is a side view of a transformer that includes two different gauge wires, each wound around approximately half of a magnetic core.
Figure 12:
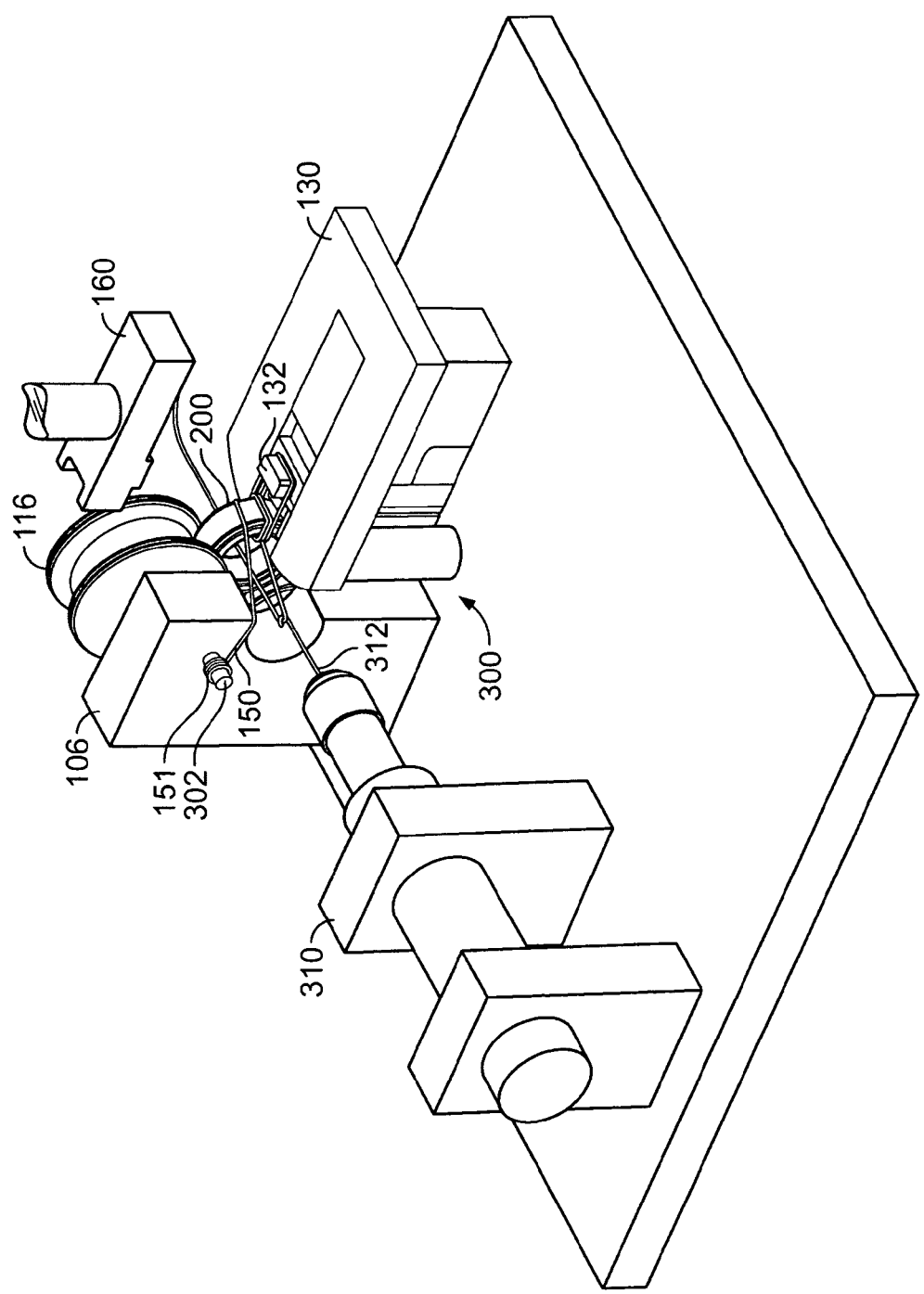
FIG. 12 shows the main parts of a hook winding apparatus in accordance with one embodiment of the present invention.

It is appreciated from the present invention that after the core is spirally wound, additional layers of wire may be added. The teachings of the invention provide that a form tool have an outside profile that matches the inside profile of the layer of wire that the additional layer is placed thereon. In addition, different gauge wires may be used on the same core, as illustrated in FIG. 11C. A first gauge wire 150*a* is spirally wound around a first portion 220*a* of a core 200 and a second gauge wire 150*b* is spirally wound around a second portion 220*b* of the same core 200.

The angle at which the wire is pinched may be different to achieve various results. However, the angle which permits the most amount of turns for a given wire will depend upon the inside of the core when the outside turns are touching each other. Mathematically, the angle is determined by the following $$\text{angle} = \sin^{-1}\left(\frac{\text{Wire Diameter}}{\text{Wire Diameter} + \text{Core Outer Diameter}}\right)$$

When the present invention is employed the following characteristics were determined: (1) increase inductance—using the present invention, more turns of the same wire size can be added to the same core, this will increase the inductance of the inductor when all other things remain equal; (2) lower temperature rise—the present invention allows a larger diameter wire to fit into the internal diameter of the core without changing the size of the core, a larger diameter wire reduces the copper losses and will therefore reduce the temperature rise; (3) decrease size—the present invention allows more turns of the same wire size to be wound around a smaller core and therefore decreases the size and weight, as such a smaller design will be able to have the same inductance and temperature rise; and (4) decrease noise—the present invention also decreases the electro magnetic interference ("EMI") or noise normally produced by an inductor; this is due to the gap between the start and finish of the wound wire, as the larger gap decreases EMI.

The core 200 may also be wound manually in a process known as "hook winding." The present invention includes winding a core by a hook winding process and apparatus with the additional feature of forming corners in the wire that correspond to the inside corners of the core and/or flattens or pinches a portion of the wire that wraps around the side wall, inside corners and inside wall of the core. It also being appreciated that the pinched portion may be more or less then what is illustrated herein.

Figure 13:
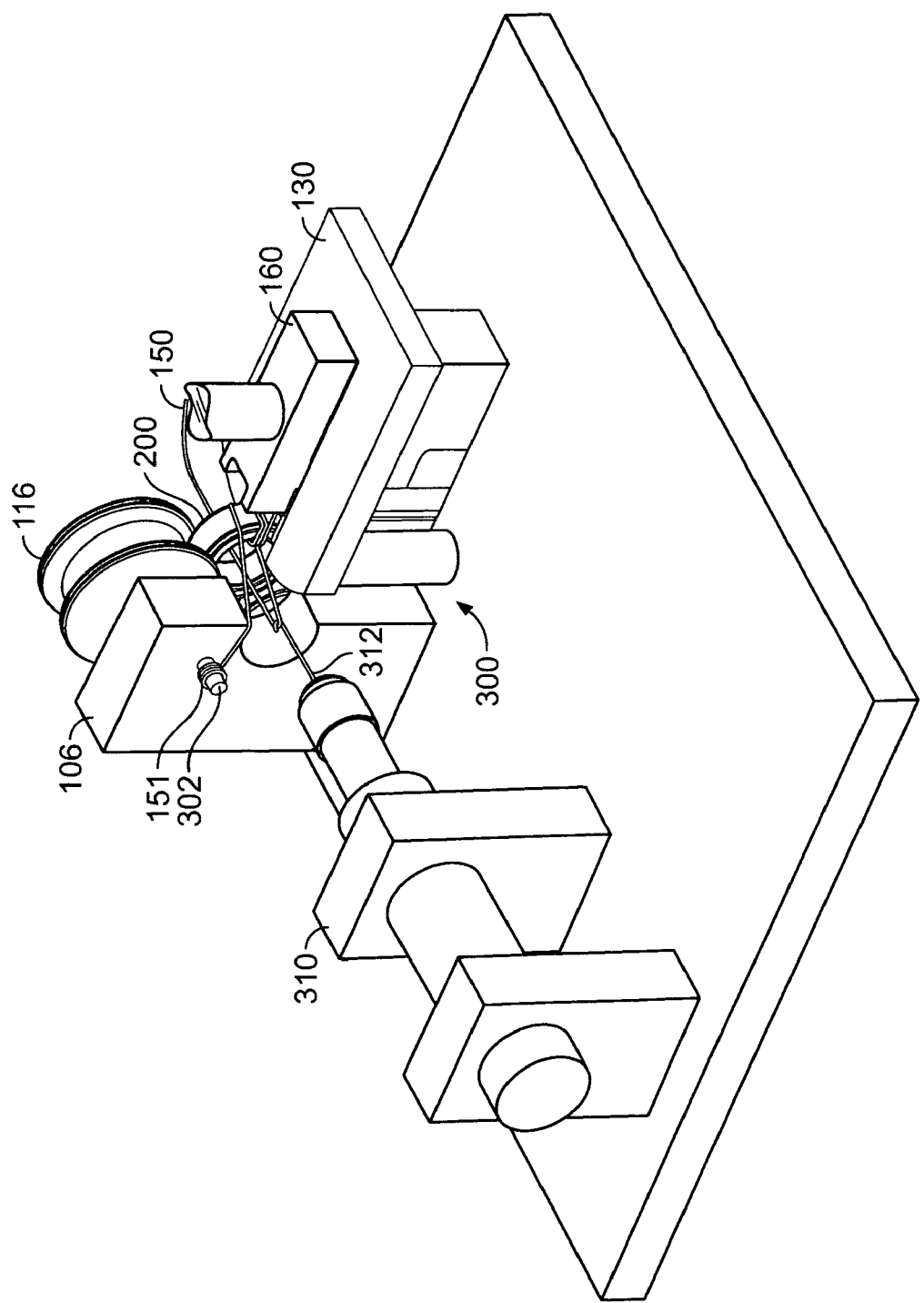
FIG. 13 is a perspective view of the hook winding apparatus from FIG. 12 illustrating the flattening tool pinching the wire.
Figure 14:
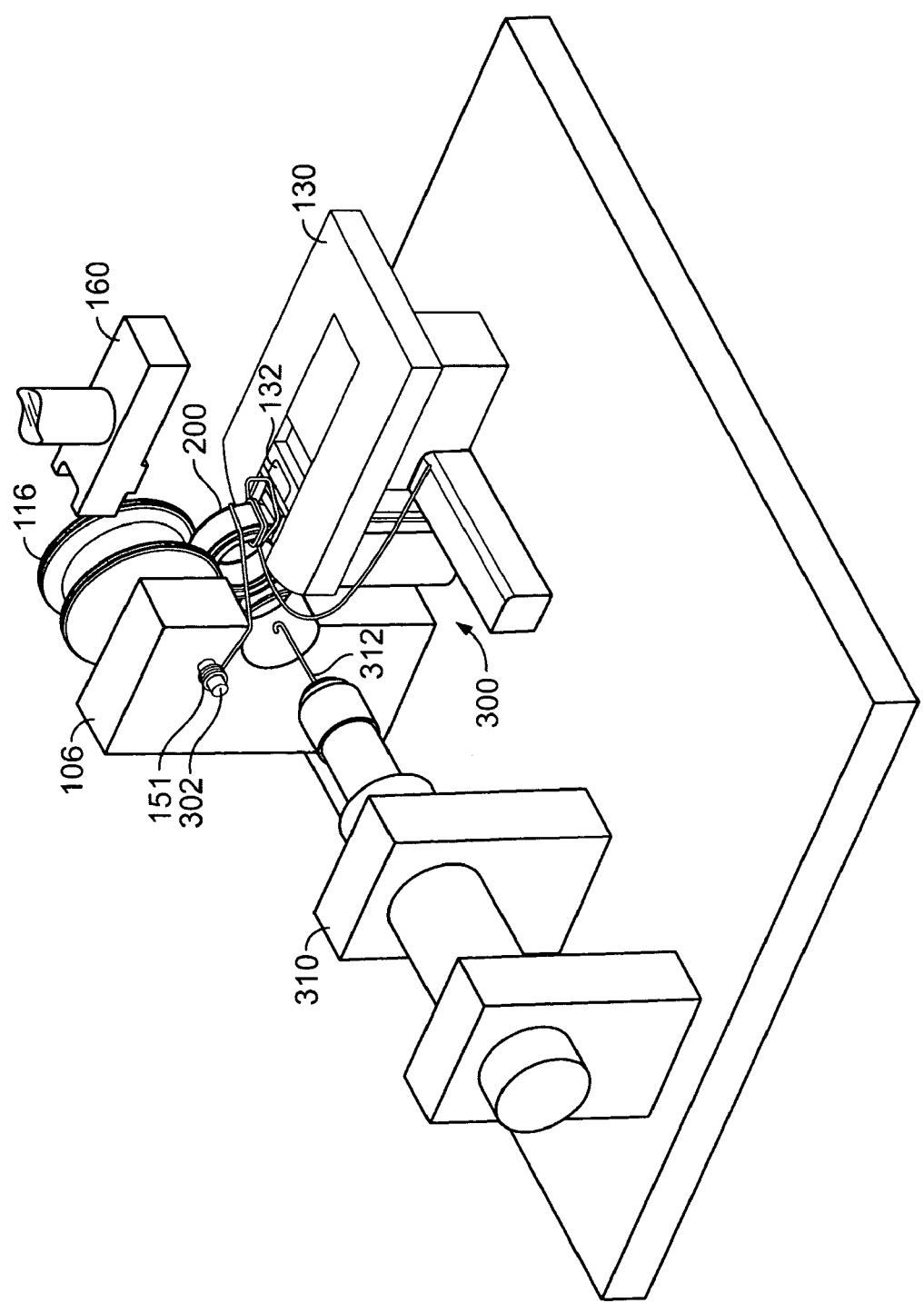
FIG. 14 is a perspective view of the hook winding apparatus from FIG. 12 illustrating the flattening tool and the form tool being retracted.
Figure 15:
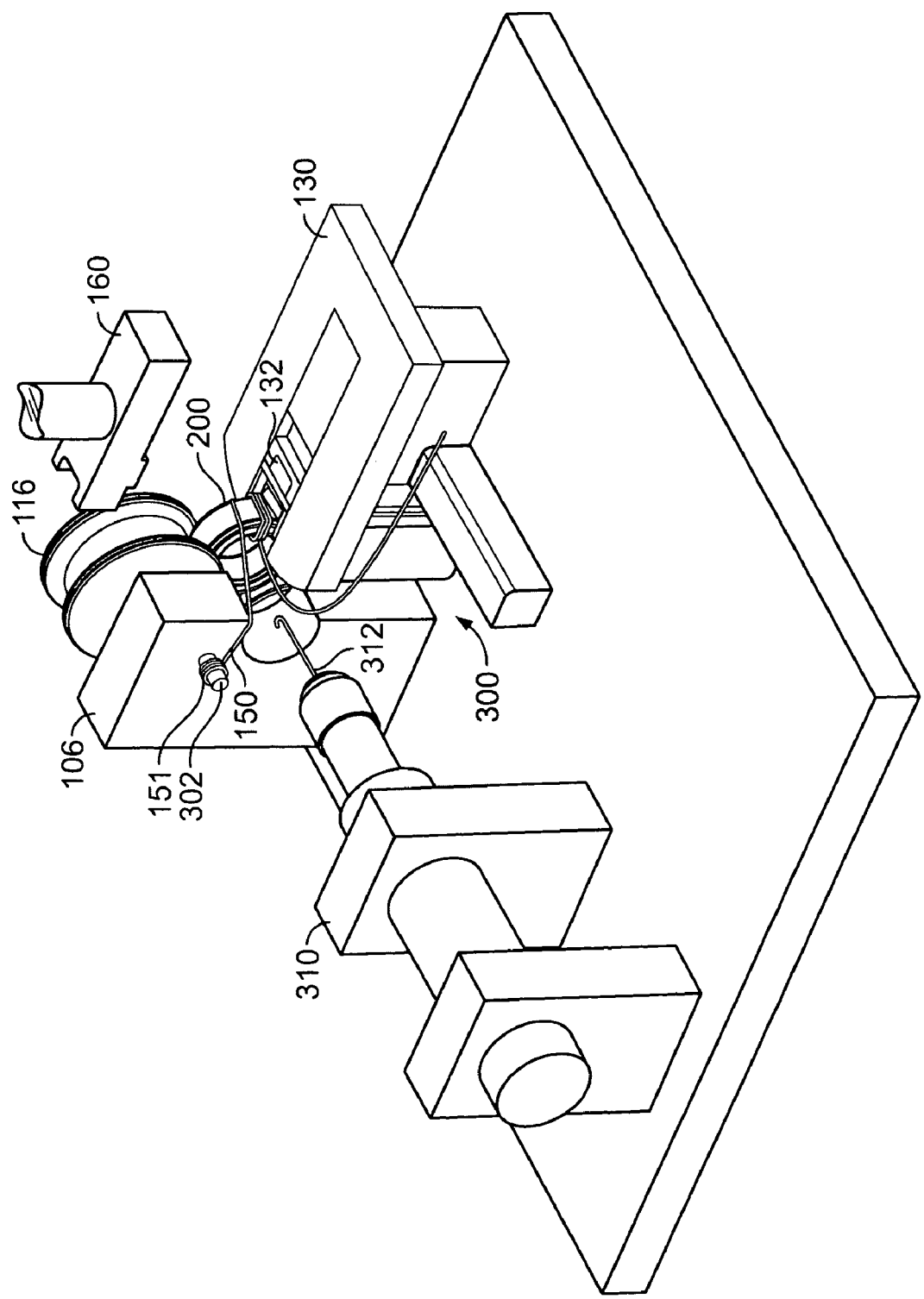
FIG. 15 is a perspective view of the hook winding apparatus from FIG. 12 illustrating the wire being pulled tight around the core.

Referring now to FIGS. 12 through 15, a hook winding apparatus 300 is illustrated and a method for winding a core using said apparatus will be disclosed. A wire 150 (typically round for this example) is provided with a lead portion 151 secured to a post 302. The post 302 may be provided on the core rotation mechanism and support 106. The wire 150 is wrapped around the form tool 132 and placed in a hook 312 that is extended to an initial position from a hook support 310. The hook 312 is retracted to pull the wire around the form tool 132 to form a preformed portion 154 (such as shown in FIG. 9*b*) in the wire 150. The wire is then pinched prior to winding around the core. A flattening or pinching tool 160 is pressed down onto the wire 150 (FIG. 13). As mentioned above the wire may be pinched about the preformed portion 154 that corresponds to the inside profile of the core 200. The wire may include a tapering region between the pinched portion and unpinched portion. The flattening tool 160 and the form tool 132 is retracted (FIG. 14). The wire 150 is pulled tight around the core 200 (FIG. 15) such that the pinched preformed portion aligns with the inside profile of the core 200. The core 200 is rotated, the form tool 132 is extended, and the hook 312 is extended or placed in the initial position. The process is repeated until the core is spirally wound with the wire 150 with the formed corners.

Figure 16A:
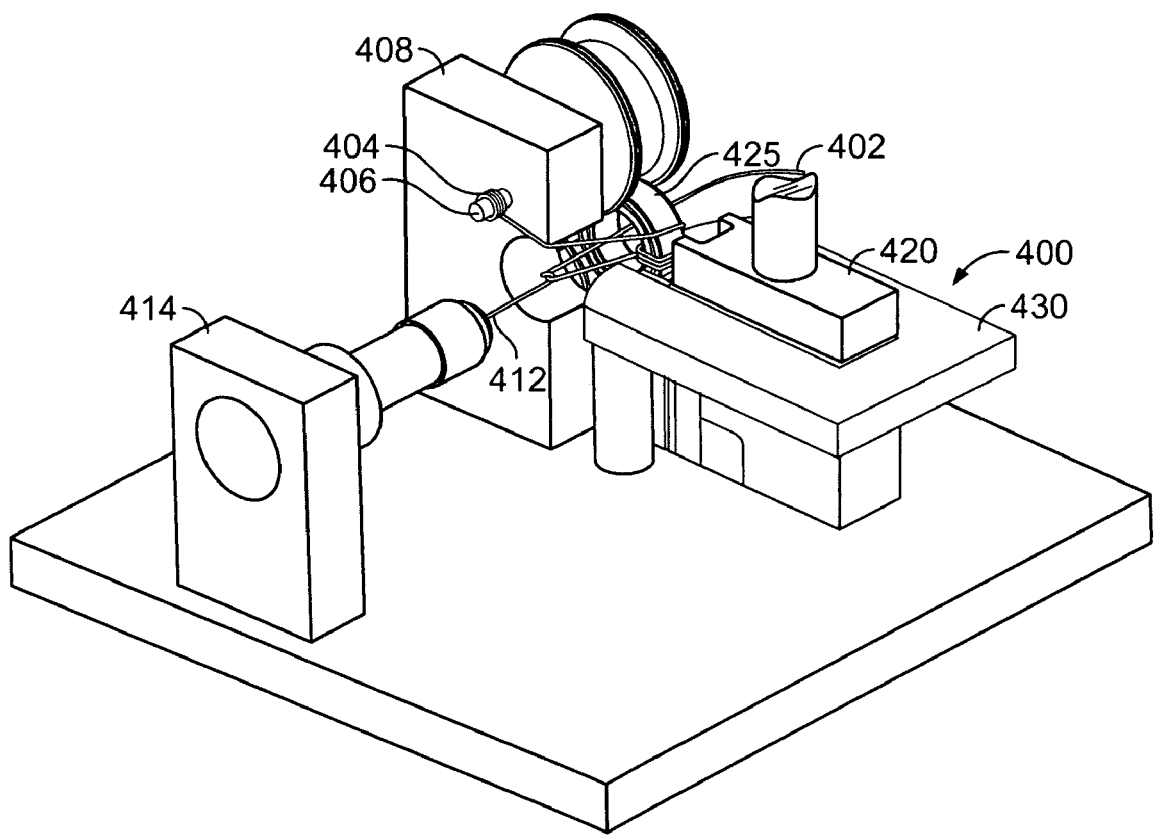
FIG. 16a is a perspective view of a hook winding apparatus with a guide tool positioned about the form tool to prevent a rectangular wire from warping while the wire is spirally wound around a core.
Figure 16B:
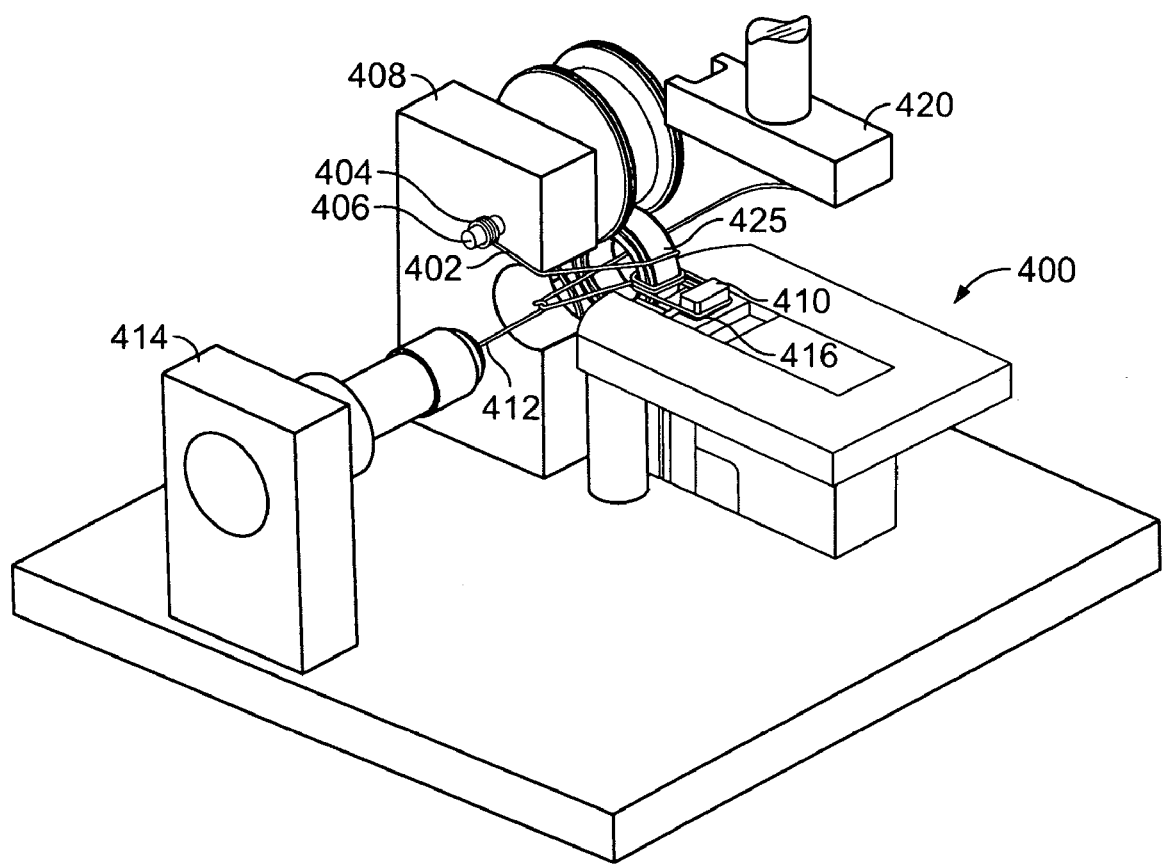
FIG. 16b is a perspective view of the hook winding apparatus with the guide tool partially removed from the form tool table, done for illustration purposed only.

Referring now to FIG. 16*a* and FIG. 16*b* in another embodiment, a hook winding apparatus 400 is used with a rectangular wire 402 with a lead portion 404 secured to a post 306. The post 306 may be provided on a core rotation mechanism and support 408. The wire 402 is wrapped around a form tool 410 with an outside profile as previously discussed. The wire 402 is also placed in a hook 412 that is extended to an initial position from a hook support 414. The hook 412 is retracted to pull the wire around the form tool 410 to form a preformed portion 416 in the wire 402. A guide tool 420 is used to guide the rectangular wire around the form tool 410 without having the wire twist or wrap around when the preformed portion is being formed. The form tool 410 is retracted (not shown) and the wire 402 is pulled tight around the core 425 such that the preformed portion 416 aligns with the inside profile of the core 425. The core 425 is rotated and form tool 410 is extended. The hook 412 is also extended or placed in the initial position. The process is repeated until the core is spirally wound with the wire 402.

While FIG. 16b illustrated the guide tool 420 being moved or retracted, it is only moved for purposes of illustrating other components of the apparatus 400. The guide tool 420 may be fixed in positioned such that the wire 402 slides between the guide tool 420 and the form table 430.

Comparison between an inductor made in accordance with the present invention being both formed and pinched (hereinafter "Pinched Wire") to a round-wire inductor is shown in the following tables:

Table No. 1 represents the "Pinched Wire" calculations for a core such as a Magnetics Inc. part number 77083-A7 core. Using the present invention an inductance of 245 mH and a temperature rise of 38.5° C. was calculated. All calculations in the table are based on a single layer winding and a minimum start to finish wire spacing of 0.319". This spacing and single layer winding are necessary to maintain acceptable EMI levels.

TABLE NO. 1

| Pinched Wire | |
| --- | --- |
| Core Size | 0.95" ID × 1.57" OD × 0.57" High |
| Finished Coil Size | 0.77" ID × 1.75" OD × 0.75" High |
| Wire Size | 14½ AWG (Pinched dimension 0.038" × 0.090") |
| Turns | 55 |
| Inductance | 245 mH |
| DC Resistance | 25 mΩ |
| Temperature Rise with 12ADC | 38.5° C. |
| Spacing between Start & Finish | 0.319" |

Table No. 2 shows the maximum round wire that can be wound on the same core (Magnetics Inc. p/n 77083-A7) such that the number of turns are equal to that which was achieved in the Pinched Wire example above. The calculations show that for an equivalent inductance the wire size must be reduced to 17½ AWG. The reduction in wire size yields a 104% increase in DC Resistance and an 80% increase in temperature rise (as temperature rise ° C.=[Total power dissipation mW/Available surface area cm$^2$]$^{0.833}$

TABLE NO. 2

| Maximum Round Wire Utilizing Same Core | |
| --- | --- |
| Core Size | 0.95" ID × 1.57" OD × 0.57" High |
| Finished Coil Size | 0.86" ID × 1.66" OD × 0.66" High |
| Wire Size | 17½ AWG |
| Turns | 55 |
| Inductance | 245 mH |
| DC Resistance | 51 mΩ |
| Temperature Rise with 12ADC | 69.4° C. |
| Spacing between Start & Finish | 0.376" |

Table No. 3 shows an 11.4% increase in OD necessary to maintain the same Height, Inductance, and temperature rise as the "Pinched Wire" technique.

TABLE NO. 3

| Smallest Core/Coil Size for Equivalent Inductance, Temperature Rise, and Terminal Spacing Using Round Wire | |
| --- | --- |
| Core Size | 0.95 ID × 1.85" OD × 0.57" High |
| Finished Coil Size | 0.84 ID × 1.95" OD × 0.68" High |
| Wire Size | 16 AWG |
| Turns | 46 |
| Inductance | 245 mH |
| DC Resistance | 36 mΩ |
| Temperature Rise with 12ADC | 42.4° C. |
| Spacing between Start & Finish | 0.368" |

From the foregoing and as mentioned above, it will be observed that numerous variations and modifications may be effected without departing from the spirit and scope of the novel concept of the invention. It is to be understood that no limitation with respect to the specific embodiments illustrated herein is intended or should be inferred. It is, of course, intended to cover by the appended claims all such modifications as fall within the scope of the claims.

The invention claimed is:

1. A method of winding a magnetic core, comprising:
providing a shuttle loaded with a wire;
arranging a magnetic core such that the shuttle with the shuttle passing through a central hole of the magnetic core, the magnetic core having an inside profile;
providing a form tool that has an outside profile that substantially corresponds to the inside profile defined by the magnetic core; and
unloading the wire from the shuttle to spirally wind the magnetic core in which the wire wraps around the outside profile defined by the form tool prior to winding around the magnetic core for forming a preformed portion defined on said wire that substantially corresponds to the inside profile defined by the magnetic core.

2. The method of claim 1 further comprising automatically rotating the shuttle for automatically unloading the wire during winding of the magnetic core.

3. The method of claim 2 further comprising rotating the magnetic core about its central axis such that the magnetic core is spirally wound with the wire during the winding thereof.

4. The method of claim 1 further comprising retracting the form tool subsequent to the preformed portion on said wire.

5. The method of claim 1 further comprising pinching a portion of wire wrapped around the forming tool.

6. The method of claim 5 further comprising wrapping the wire around the magnetic core such that the pinched portion of wire wraps around the inside profile defined by the magnetic core.

7. A method of winding a magnetic core comprising:
providing a shuttle loaded with a wire;
arranging a magnetic core such that the shuttle passing through a central hole of the magnetic core, the magnetic core having an inside profile;
securing a lead of the wire around the magnetic core;
providing a form tool that has an outside profile that corresponds to the inside profile defined by the magnetic core; and
rotating the shuttle and unloading the wire to wrap the wire around the form tool such that the wire has a preformed portion that corresponds to the inside profile defined by the magnetic core;
temporarily suspending the rotation of the shuttle; and
retracting the form tool and resume rotating the shuttle to draw the wire around the magnetic core whereby the preformed portion of the wire is aligned with the inside profile defined by the magnetic core.

8. The method of claim 7 further comprising rotating the magnetic core about its central axis such that the magnetic core is spirally wound with the wire.

9. The method of claim 7 further comprising flattening a portion of the wire wrapped around the forming tool prior to retracting the form tool to create a pinched portion of wire.

10. The method of claim 7 further comprising flattening the wire wrapped around the forming tool prior to retracting the form tool to create a pinched portion of wire that corresponds to the inside profile defined by the magnetic core.

11. The method of claim 10 wherein the step of flattening the wire further includes flattening the wire at an angle to define a pinched region that tapers from a non-pinched portion of wire to a pinched portion of wire.

12. A method of winding a magnetic core, comprising:
 providing a wire;
 arranging a magnetic core on a support such that the wire passes through a central hole of the magnetic core, the magnetic core having an inside profile;
 providing a form tool that has an outside profile that corresponds to the inside profile defined by the magnetic core;
 wrapping the wire around the outside profile defined by the form tool to create a preformed portion that corresponds to the inside profile defined by the magnetic core; and
 winding the wire around the magnetic core, wherein the preformed portion aligns with the inside profile defined by the magnetic core.

13. The method according to claim 12 further comprising:
 fastening the wire on a hook after wrapping the wire around the form tool; and
 retracting the hook to form the preformed portion on the wire.

14. The method according to claim 12, wherein subsequent to the step of retracting the hook to form the corners and the portion therebetween on the wire, the method includes the step of pinching a portion of the wire the corresponds to the inside profile defined by the magnetic core.

15. The method according to claim 14, wherein the step of pinching a portion of the wire includes pinching the portion of the wire at an angle to form a tapered region between the pinched portion and unpinched portion of wire.

16. The method according to claim 12, wherein the step of providing a wire includes loading said wire on a shuttle and passing said shuttle through the central hole of the magnetic core and includes mechanically rotating the shuttle such that the wire is unloaded from the shuttle automatically.

17. The method of claim 12 further comprising a guide tool positioned above the form tool to guide the wire around the form tool without having the wire warp.

18. A method of winding a magnetic core having an inside profile with a wire, the method comprising:
 forming portions of preformed regions on the wire, by
  (a) providing a forming tool that has an outside profile substantially equal to the inside profile of the magnetic core,
  (b) tightly wrapping a region of said wire about the forming tool to create a preformed region, and
  (c) pinching said preformed regions to create pinched regions; and
 winding the wire onto the magnetic core such that the preformed regions on the wire abut the inside profile of the magnetic core whereby said pinched regions abut the inside profile of the magnetic core during the winding of said wire.

19. The method of claim 18 further including providing a pinching tool to pinch said preformed region.

* * * * *